(12) United States Patent
Tanaka et al.

(10) Patent No.: US 11,352,448 B2
(45) Date of Patent: Jun. 7, 2022

(54) METHOD OF TRANSFERRING SLURRY, METHOD OF PRODUCING POLYOLEFIN, AND USE THEREOF

(71) Applicant: Sumitomo Chemical Company, Limited, Tokyo (JP)

(72) Inventors: Naohiro Tanaka, Osaka (JP); Satoshi Itoguchi, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 466 days.

(21) Appl. No.: 16/449,953

(22) Filed: Jun. 24, 2019

(65) Prior Publication Data

US 2019/0389982 A1  Dec. 26, 2019

(30) Foreign Application Priority Data

Jun. 26, 2018 (JP) .............................. JP2018-120943

(51) Int. Cl.
*C08F 2/14* (2006.01)
*B01J 8/00* (2006.01)
(Continued)

(52) U.S. Cl.
CPC ............... *C08F 2/14* (2013.01); *B01J 8/0045* (2013.01); *C08F 2/01* (2013.01);
(Continued)

(58) Field of Classification Search
USPC .................................. 417/554, 900; 526/919
See application file for complete search history.

(56) References Cited

U.S. PATENT DOCUMENTS

| 4,690,804 A | * | 9/1987 | Rohlfing | ............... | B01F 3/1221 |
| | | | | | 222/241 |
| 5,098,667 A | * | 3/1992 | Young | ..................... | B01J 8/001 |
| | | | | | 137/4 |
| 7,906,597 B2 | | 3/2011 | Fouarge | | |

FOREIGN PATENT DOCUMENTS

| JP | H06017942 A | 1/1994 |
| JP | 2001315713 A | 11/2001 |

(Continued)

OTHER PUBLICATIONS

Extended European Search Report dated Dec. 3, 2019 in EP Application No. 19182029.9.

*Primary Examiner* — Fred M Teskin
(74) *Attorney, Agent, or Firm* — Panitch Schwarze Belisario & Nadel LLP (57) ABSTRACT

A method of transferring a slurry is provided. The method involves transferring a slurry containing particles and a liquid using a transfer pump equipped with a ball type check valve. The transfer pump is operated under the condition satisfying the following formula: $7.8 \times 10^3 < P \leq 5.0 \times 10^5$. In the formula, $P = W(\rho_1/(\rho_b - \rho_1))^{0.5}/(C \cdot d(d+R)R^{0.5})$. W represents the particle flow rate (kg/hr) in the slurry passing through the ball type check valve, C represents the particle concentration (kg/m3) in the slurry, d represents the maximum particle diameter (m) of the particles in the slurry, R represents the ball diameter (m) of the check valve, $\rho_1$ represents the density (kg/m3) of the liquid, and $\rho_b$ represents the density (kg/m$^3$) of the ball of the check valve.

10 Claims, 1 Drawing Sheet

(51) Int. Cl.
*C08F 2/01* (2006.01)
*C08F 10/06* (2006.01)
*C08F 10/08* (2006.01)
*C08F 10/14* (2006.01)
*F16K 21/08* (2006.01)

(52) U.S. Cl.
CPC ..... *B01J 2208/00938* (2013.01); *C08F 10/06* (2013.01); *C08F 10/08* (2013.01); *C08F 10/14* (2013.01)

(56) References Cited

FOREIGN PATENT DOCUMENTS

| | | |
|---|---|---|
| JP | 2006207402 A | 8/2006 |
| WO | 2012013800 A1 | 2/2012 |

\* cited by examiner

METHOD OF TRANSFERRING SLURRY, METHOD OF PRODUCING POLYOLEFIN, AND USE THEREOF

CROSS-REFERENCE TO RELATED APPLICATIONS

This application claims priority under 35 U.S.C. § 119(b) to Japanese Patent Application No. 2018-120943, filed Jun. 26, 2018, the disclosure of which is incorporated by reference herein in its entirety.

TECHNICAL FIELD

The present invention relates to a method of transferring a slurry, a method of producing a polyolefin, and use thereof.

BACKGROUND TECHNOLOGY

Slurry transfer can be widely applied to processes that require the supply of a slurry containing solid particles in industrial fields such as the chemical industry.

For example, Patent Documents 1 and 2 describe a method of preventing stagnation and accumulation of coarse particles in a check valve by setting the clearance between the ball and the guide of the check valve to a certain size or more.

PRIOR ART DOCUMENT

Patent Document

[Patent Document 1] Japanese Unexamined Patent Application Publication No. 6-017942 (published on Jan. 25, 1994)

[Patent Document 2] International Publication WO2012/013800 (published on Feb. 2, 2012)

SUMMARY OF THE INVENTION

Problems to be Solved by the Invention

However, even in a pump for slurry transfer having the structure described in Patent Documents 1 and 2 as described above, the clogging due to a slurry in the check valve cannot be completely eliminated, and transfer of the slurry becomes impossible, and there is a problem that it is often necessary to stop the operation of the plant to clean the inside of the pump. Hence, there is a need for a method that can more reliably suppress the clogging of the ball type check valve due to particles contained in the slurry.

If the frequency to stop the operation of the pump and clean the valve can be reduced, it is possible to reduce the raw material loss and the amount of the waste liquid generated by the cleaning. Therefore, also from the viewpoint of reducing the environmental load, it is required to suppress the clogging of the valve. In addition, for example, when clogging occurs in a valve used for an equipment such as a plant, loss of raw materials and energy that occurs when resuming the operation after stopping the operation of the equipment such as a plant is large, thus, stabilization of the operation is required also from the standpoint of energy saving.

Hence, the object of the present invention is to realize a slurry transfer method that can prevent clogging due to particles contained in the slurry and can operate stably for a longer period of time the transfer pump for transferring the slurry.

Means for Solving the Problems

The present inventors have repeatedly examined the relationship between occurrence of clogging due to the slurry and various factors such as the positional relationship between the ball and the pedestal of the check valve and the slurry flow rate, resulting in completion of the present invention.

Therefore, the method of transferring a slurry according to one aspect of the present invention for solving the above-mentioned problems is a method of transferring a slurry, in which a transfer pump equipped with a ball type check valve is operated under the condition satisfying the following formula (1) to transfer a slurry containing particles and a liquid;

$$7.8 \times 10^3 < P \leq 5.0 \times 10^5 \qquad (1)$$

wherein, $P = W(\rho_1/(\rho_b - \rho_1))^{0.5}/(C \cdot d(d+R)R^{0.5})$ in the formula (1), W represents the particle flow rate (kg/hr) in the slurry passing through the ball type check valve, C represents the particle concentration (kg/m$^3$) in the slurry, d represents the maximum particle diameter (m) of the particles in the slurry, R represents the ball diameter (m) of the check valve, $\rho_1$ represents the density (kg/m$^3$) of the liquid, and $\rho_b$ represents the density (kg/m$^3$) of the ball of the check valve.

<2> The method of transferring a slurry according to <1>, wherein the ball diameter of the ball type check valve is in a range of 5 mm or more and 50 mm or less.

<3> The method of transferring a slurry according to <1> or <2>, wherein the maximum particle diameter of particles in the slurry is 10 µm or more and less than 5000 µm.

<4> The method of transferring a slurry according to any one of <1> to <3>, wherein the concentration of particles in the slurry is in a range of 0.001 kg/m$^3$ or more and 500 kg/m$^3$ or less.

<5> The method of transferring a slurry according to any one of <1> to <4>, wherein the particle flow rate in the slurry passing through the ball type check valve is in a range of $1.0 \times 10^{-4}$ kg/hr or more and 100 kg/hr or less.

<6> The method of transferring a slurry according to any one of <1> to <5>, wherein the particles contained in the slurry are particles containing either or both of an inorganic substance and an organic substance, the inorganic substance is at least one inorganic substance selected from the group consisting of an inorganic compound and a metal, and the organic substance is a polymer compound.

<7> The method of transferring a slurry according to any one of <1> to <6>, wherein the liquid of the slurry is a liquid containing at least one selected from the group consisting of a saturated aliphatic hydrocarbon, an unsaturated aliphatic hydrocarbon, a cyclic aliphatic hydrocarbon, an aromatic hydrocarbon, an alcohol, an ether, an ester, a ketone and water.

<8> The method of transferring a slurry according to <7>, wherein the liquid of the slurry is a liquid containing at least one selected from the group consisting of a saturated aliphatic hydrocarbon, an unsaturated aliphatic hydrocarbon, a cyclic aliphatic hydrocarbon, an aromatic hydrocarbon and an ether, the saturated aliphatic hydrocarbon is at least one saturated aliphatic hydrocarbon selected from the group consisting of a saturated aliphatic hydrocarbon having 3 to 6 carbon atoms, the unsaturated aliphatic hydrocarbon is at least one unsaturated aliphatic hydrocarbon selected from the group consisting of an alkene having 3 to 6 carbon atoms, the cyclic aliphatic hydrocarbon is at least one cyclic aliphatic hydrocarbon selected from the group consisting of cyclohexane and methylcyclopentane, and the aromatic hydrocarbon is at least one aromatic hydrocarbon selected from the group consisting of toluene and xylene.

<9> The method of transferring a slurry according to any one of <1> to <8>, wherein the temperature of the slurry transferred by using the transfer pump is in a range of −10° C. or higher and 90° C. or lower.

<10> A method of producing a polyolefin comprising a step of transferring the slurry by the method of transferring a slurry according to any one of <1> to <9>, and a step of polymerizing an olefin in the presence of the transferred slurry, wherein the particles in the slurry are particles containing a catalyst.

<11> A method of determining conditions for transferring a slurry by the formula (1), specified in the method of transferring a slurry according to <1>.

Effect of the Invention

According to one aspect of the present invention, it is possible to realize a slurry transfer method which can prevent clogging of a ball type check valve by particles contained in the slurry and can operate stably for a longer period of time the transfer pump for transferring the slurry. For this reason, it is possible to reduce raw material loss caused by stopping the pump and cleaning the valve and to lower the environmental load due to the treatment of the waste liquid, and for example, in an equipment such as a plant, it is possible to realize slurry transfer that can save energy in its operation. When this transfer method is used in the polymerization step of a polyolefin, generation of flake lumps, which is the cause of operation instability, can be suppressed in the polymerization tank to which the slurry is transferred, so the transfer pump for transferring a slurry can be operated stably for a longer period of time.

MODES FOR CARRYING OUT THE INVENTION

Hereinafter, one embodiment of the present invention will be described in detail.
<Slurry Transfer Method>

Figure 1:
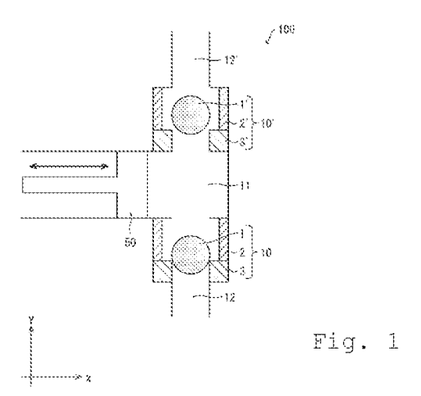
FIG. 1 is a schematic view of a plunger pump 100 equipped with a check valve 10 used in a method of transferring a slurry according to one embodiment.
Figure 2:
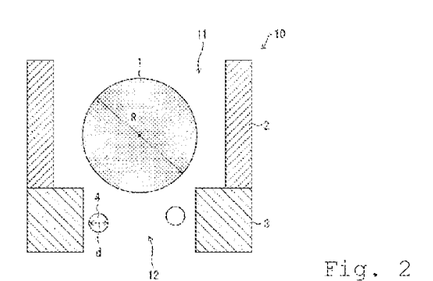
FIG. 2 is a partially enlarged cross-sectional view of a check valve 10 used in a method of transferring a slurry according to one embodiment.

The slurry transfer method according to one aspect will be described with reference to FIGS. 1 and 2. FIG. 1 is a view for explaining the outline of a slurry plunger pump 100 used in the slurry transfer method according to one embodiment of the present invention, and FIG. 2 is a view for explaining the outline of a ball type check valve (hereinafter, referred to simply as "check valve" 10) used in the slurry transfer method. The type of the transfer pump used in the present invention is not limited. As the transfer pump, for example, a diaphragm pump is preferably used in addition to the plunger pump shown in FIG. 1 from the viewpoint of pressure-feeding the slurry at a high discharge pressure. In the slurry transfer method according to one aspect, the plunger pump 100 is used from the viewpoint of pressure-feeding the slurry at a high discharge pressure of 0.5 MPa or more.

As one aspect of the present invention, a method of transferring the slurry upward in the y-axis direction (vertical direction) by periodically moving the piston 50 of the plunger in the x direction to the left and right will be described (FIG. 1). The plunger pump (transfer pump) 100 has check valves 10 and 10' for preventing back flow of a slurry and a casing 11 in communication with the plunger having the piston 50, and the slurry is transferred from a tube 12 via the plunger pump 100 into the target device (not shown) through a tube 12'.

More specifically, the plunger pump 100 moves the piston 50 to the right in the x direction to make the pressure of the slurry in the casing 11 higher than the pressure of the slurry in the pipe 12 and the pipe 12'. At this time, a part of the ball 1 of the check valve 10 is fitted into the opening of the pedestal 3 to close the opening. At the same time, in the check valve 10', the ball 1' is pushed up by the pressure of the slurry in the casing 11 to open the opening of the pedestal 3'. Thus, the slurry in the casing 11 flows into the pipe 12' without flowing back into the pipe 12. In contrast, the plunger pump 100 moves the piston 50 to the left in the x direction to make the pressure of the slurry in the casing 11 lower than the pressure of the slurry in the pipe 12 and the pipe 12'. At this time, in the check valve 10', a part of the ball 1' is fitted into the opening of the pedestal 3' by its own weight (or by being sucked toward the opening of the pedestal 3') to close the opening. At the same time, in the check valve 10, the ball 1 is pushed up by the pressure of the slurry in the tube 12 to open the opening of the pedestal 3. Thus, the slurry in the tube 12' does not flow back into the casing 11, and the slurry in the tube 12 flows into the casing 11.

The check valve 10 has a guide 2 which is arranged to surround the ball 1. The guide 2 is provided so that, when the ball 1 opens the opening of the pedestal 3, it prevents the ball 1 from being displaced in the plane parallel to the x direction while securing the flow path of the slurry flowing in the casing 11, and the ball 1 quickly opens and closes the valve as the plunger 50 operates.

The check valve 10 and the check valve 10' are the same in the material and the size except that the arrangement with respect to the casing 11 is different and that the ball 1 and the ball 1' alternately open and close the valve, and the particle concentration and particle flow rate of the slurry passing through both are equal. Therefore, in the present specification, the method of transferring a slurry according to one aspect will be described below based on the operation of the check valve 10, however, it is needless to say that, according to the present invention, also the check valve 10' prevents clogging due to particles in the slurry.

In the slurry transfer method according to one aspect, the plunger pump 100 is operated under the condition satisfying the following formula (1).

$$7.8 \times 10^3 < P \leq 5.0 \times 10^5 \tag{1}$$

wherein, $P = W(\rho_1/(\rho_b - \rho_1))^{0.5}/(C \cdot d(d+R)R^{0.5})$

In the formula (1), W represents the particle flow rate (kg/hr) in the slurry passing through the check valve 10 of the plunger pump 100, C represents the particle concentration (kg/m$^3$) in the slurry, d represents the maximum particle diameter (m) of the particles in the slurry, and R represents the diameter (m) of ball 1 of the check valve. $\rho_l$ represents the density (kg/m$^3$) of the liquid, and $\rho_b$ represents the density (kg/m$^3$) of the ball of the check valve. In addition, the maximum particle diameter d of the particles and the diameter R of the ball 1 which are explained below are converted into m (meter) and substituted in the formula (1).

In the slurry transfer method according to one aspect, the transfer conditions of the slurry are set such that the lower limit value of the parameter obtained from the formula (1) is greater than 7.8×10$^3$.

Moreover, if the upper limit value of the parameter calculated from the formula (1) shall be 5.0×10$^5$ or less, a slurry can be transferred with good productivity and back flow of a slurry can be prevented.

Further, in the slurry transfer method according to one aspect, it is preferable to operate the plunger pump 100 under the condition satisfying the following formula (2), and it is more preferable to operate under the condition satisfying the following formula (3), from the viewpoint of preventing clogging of the check valve 10 more suitably.

$$8.0\times10^3 \leq P \leq 4.0\times10^5 \quad (2)$$

$$1.2\times10^4 \leq P \leq 3.5\times10^5 \quad (3)$$

In the formulae (2) and (3), $P = W(\rho_l/(\rho_b-\rho_l))^{0.5}/(C \cdot d(d+R)R^{0.5})$.

P common to the formulae (1) to (3) is a parameter for causing the ball 1 of the check valve 10 to float to transfer a slurry. This parameter will be described.

(Parameter for Transferring Slurry)

$$P = W(\rho_l/(\rho_b-\rho_l))^{0.5}/(C \cdot d(d+R)R^{0.5})$$

The diameter R in the formulae (1) to (3) is the diameter of the ball 1 of the check valve 10 and may be referred to as the ball diameter (FIG. 2). The diameter R of the ball 1 is preferably in a range of 5 mm or more and 50 mm or less, and for example, it may be selected in advance in a range of 5 mm or more and 50 mm or less based on the concentration of the slurry to be transferred and the prediction of the maximum particle diameter of particles contained in the slurry. That is, when it is predicted that the concentration of particles in the slurry to be transferred is high, it is possible to select a check valve equipped with a ball having a smaller diameter R, for example, in a range of 5 mm or more and 50 mm or less. If the maximum particle diameter of the particles in the slurry to be transferred is expected to be large, it is preferable to select a check valve with a ball of smaller diameter R. The ball 1 is not limited, but is preferably a ball made of a metal such as SUS (Stainless Used Steel) and Hastelloy, and may be subjected to plating treatment such as chromium plating. Further, in the case of a ball having a large diameter, a ball made of a resin such as a perfluoropolyethylene resin typified by Teflon (registered trademark) may be used.

The maximum particle diameter d of the particles contained in the slurry means the particle diameter of the largest particle obtained by measuring the particle size distribution of the particles contained in the slurry. The maximum particle diameter d is the particle diameter of particles corresponding to 100% of the cumulative particle size distribution measured by laser diffraction.

The maximum particle diameter d of the particles in the slurry is preferably 10 μm or more and less than 5000 μm.

The particle concentration C of particles contained in the slurry is preferably in a range of 0.001 kg/m$^3$ or more and 500 kg/m$^3$ or less, more preferably in a range of 0.001 kg/m$^3$ or more and 250 kg/m$^3$ or less.

The particle flow rate W (kg/hr) of particles contained in the slurry is the amount (weight) of particles contained in the slurry transferred by the plunger pump 100 per unit time. The particle flow rate can be determined by the following formula (4).

Particle flow rate $W$ (kg/hr)=particle concentration $C$ (kg/m$^3$)×average flow rate of the slurry (m$^3$/hr) (4)

In the formula (4), the average flow rate is defined by the size and operation of the plunger with the piston 50 and is controllable by the plunger pump 100. Thereby, the particle flow rate W (kg/hr) of the slurry having the predetermined particle concentration C (kg/m$^3$) can also be adjusted.

The density of the liquid, whose vapor pressure at a temperature of 10° C. is less than 101.3 kPa, is measured at a temperature of 10° C. by using pycnometer based on JIS Z 8804.

The density of the liquid, whose vapor pressure at a temperature of 10° C. is 101.3 kPa or more, is measured at a temperature of 10° C. based on "6.8 the method of measuring density (actual measurement)" of JIS K 2240.

The density of the ball of the check valve is measured at a temperature of 10° C. by using Le Chatelier flask based on JIS Z 8807.

In the slurry transfer method, as one example, the particle concentration C of the slurry and/or the particle flow rate W may be adjusted based on the ball diameter R of the valve possessed by the transfer pump and the maximum particle diameter d of particles in the slurry. The ball diameter R of the valve of the pump may be selected based on the maximum particle diameter d of the particles in the slurry, the desired particle concentration C, and the desired particle flow rate W. That is, the method of determining the conditions for transferring the slurry based on any of the formulae (1) to (3) specified in the slurry transferring method according to one aspect is also within the scope of the invention.

In addition, in order to prevent clogging of the check valve at the time of pump startup, it is usual that the transfer pump is started using a liquid free of particles, and after the transfer pump becomes in a state where it can flow the liquid at a desired flow rate, the fluid to be transferred is changed from the liquid free of particles to the slurry.

In contrast, in order to prevent clogging of the check valve at the time of pump stoppage, it is usual that after the fluid to be transferred is changed from the slurry to the liquid free of particles while the pump is operated at a desired flow rate, the transfer pump is stopped.

(Slurry)

In the slurry transfer method according to one aspect, the slurry to be transferred contains particles and a liquid. The particles contained in the slurry may be particles generated in a liquid. The particles may be resin particles emulsified in a liquid. In addition, in the slurry transfer method according to one aspect, the particles contained in the slurry can be porous particles.

The particles contained in the slurry include particles containing either or both of an inorganic substance and an organic substance. The inorganic substance in the particles contained in the slurry may be only one kind or plural kinds. The organic substance in the particles contained in the slurry may be only one kind or plural kinds.

Examples of the inorganic substance include metals, nonmetals, and inorganic compounds. Examples of the metal include gold, silver, magnesium and titanium, and examples of the nonmetal include carbon, and the type thereof is not limited. For example, the particles contained in the slurry may be porous particles such as activated carbon.

As the inorganic compound, a magnesium compound, a titanium compound, or a solid catalyst component containing a titanium atom and a magnesium atom may be mentioned. As the magnesium compound, for example, magnesium compounds described later are mentioned. As the titanium compound, for example, titanium compounds described later are mentioned. Solid catalyst components containing these compounds may also be porous particles.

The inorganic compound may be a metal oxide or an inorganic salt. The metal oxide includes silica, titanium oxide, zinc oxide, zirconia, alumina and cerium oxide, and the inorganic salt includes calcium hydroxide, calcium sulfate, calcium carbonate and magnesium sulfate. In addition, porous particles such as radiolite containing silica as a main component may also be mentioned as particles contained in the slurry.

Examples of the organic substance include polymer compounds, dyes (other than polymer compounds) and fibers (other than polymer compounds), and the type thereof is not limited. Examples of the polymer compound include synthetic resins and natural resins. Examples of the synthetic resin include polyolefins, polystyrenes, acrylic rubbers, acrylic resins, polyurethane resins, and epoxy resins, and examples of natural resins include starch and cellulose. In addition, sludge (sludge) generated in the process of a waste water treatment, and waste water containing sludge are also mentioned as an example of the slurry transferred by the transfer method according to the present invention.

That is, the slurry transfer method according to one aspect can be, for example, a slurry transfer method for conducting transfer of a slurry containing a filter aid to a filtration device, transfer of a slurry containing activated carbon to a waste water treatment facility and transfer of a slurry containing sludge (sludge) to a drainage tank, other than the method of transferring a slurry in the method of producing a polyolefin described later.

The liquid in the slurry is not limited as long as the particles can be dispersed therein, and for example, liquids containing at least one selected from the group consisting of a saturated aliphatic hydrocarbon, an unsaturated aliphatic hydrocarbon, a cyclic aliphatic hydrocarbon, an aromatic hydrocarbon, an alcohol, an ether, an ester, a ketone and water are mentioned. In such a liquid, a part of the inorganic substance or the organic substance constituting the particles may be dissolved.

In the present specification, the liquid means a compound (dispersion medium) that is liquid when transferring a slurry. The boiling point and the freezing point of the compound are not limited as long as it is liquid when transferring the slurry.

The saturated aliphatic hydrocarbon includes an alkane having 3 to 10 carbon atoms, and specific examples include propane, butane, pentane, or hexane. The saturated aliphatic hydrocarbon is preferably at least one saturated aliphatic hydrocarbon selected from the group consisting of a saturated aliphatic hydrocarbon having 3 to 6 carbon atoms.

The unsaturated aliphatic hydrocarbon includes an unsaturated aliphatic hydrocarbon having 3 to 10 carbon atoms, and specific examples include propylene and butene. The unsaturated aliphatic hydrocarbon is preferably at least one unsaturated aliphatic hydrocarbon selected from the group consisting of an alkene having 3 to 6 carbon atoms.

The cyclic aliphatic hydrocarbon includes cyclic aliphatic hydrocarbon having 3 to 10 carbon atoms, and preferably includes at least one cyclic aliphatic hydrocarbon selected from the group consisting of cyclohexane and methylcyclopentane.

The aromatic hydrocarbon is preferably at least one aromatic hydrocarbon selected from the group consisting of benzene, toluene and xylene.

The alcohols include, for example, methanol, ethanol, propanol, and butanol, the ethers include diethyl ether, the esters include ethyl acetate, butyl acetate, and amyl acetate, and the ketones include, for example, acetone, methyl ethyl ketone, and methyl isobutyl ketone.

According to the slurry transfer method according to one aspect of the present invention, the check valve can be prevented from being clogged by the above-mentioned slurry, so the frequency to stop the pump and clean the check valve can be reduced, and it is possible to reduce the raw material loss caused by the cleaning and the environmental load due to the treatment of the waste liquid.

(Other Components)

The slurry may further contain additives such as, for example, surfactants such as a wetting agent, an emulsifying agent and a dispersing agent, a viscosity adjusting agent, and a stabilizer, depending on the application.

<Method of Producing Polyolefin>

Hereinafter, the method of producing a polyolefin according to one aspect of the present invention will be described.

The method for producing a polyolefin according to one aspect is a polyolefin production method having a step of transferring the slurry to a polymerization reactor by the slurry transfer method according to one aspect, and a step of polymerizing an olefin in the presence of the slurry transferred to the polymerization reactor.

In the method of producing a polyolefin, the particles in the slurry are particles containing a catalyst.

The method of producing a polyolefin may comprise a step of preparing a solid catalyst component and a step of preparing a slurry of a prepolymerization catalyst in which a polyolefin is prepolymerized on the surface of the solid catalyst component, in addition to the steps of transferring a slurry and polymerizing an olefin. Each is described below.

(Step of Preparing Solid Catalyst Component)

In the method of producing a polyolefin according to one aspect, preferable catalysts for producing a polyolefin include Ziegler-Natta type catalysts and metallocene-based catalysts, and a Ziegler-Natta type catalyst is preferable. The catalyst may be a prepolymerization catalyst described later.

(Solid Catalyst Component: Ziegler-Natta Type Catalyst)

The Ziegler-Natta type catalyst includes a catalyst containing a solid catalyst component containing a titanium atom and a magnesium atom. The solid catalyst component preferably further contains a halogen atom. The solid catalyst component can be obtained by contacting a magnesium compound and a titanium compound. The titanium compound is preferably a halogenated titanium compound. The Ziegler-Natta type catalyst may contain, in addition to the solid catalyst component, an organoaluminum compound and/or an electron donating compound. The Ziegler-Natta type catalyst is preferably a catalyst containing the solid catalyst component and an organoaluminum compound, and a catalyst containing the solid catalyst component, an organoaluminum compound and an electron donating compound. Particles of such solid catalyst components, magnesium compounds and titanium compounds for producing the solid catalyst components, and by-products which can be generated in the slurry derived from these compounds are also one embodiment of particles of the inorganic substance contained in the slurry transferred by the transfer method of the present invention.

The magnesium compound may be a compound containing a magnesium atom, and specific examples thereof include metal magnesium, magnesium dihalide, dialkoxy magnesium, alkoxy magnesium halide, magnesium oxyhalide, dialkyl magnesium, alkyl magnesium halide, magnesium oxide, magnesium hydroxide and carboxylates of magnesium. Among them, magnesium compounds represented by $Mg(OR)_{2-m}X_m$ (wherein, R is a hydrocarbyl group having 1 to 20 carbon atoms, X is a halogen atom, and $0 \leq m \leq 2$) such as magnesium dihalide and dialkoxymagnesium are preferable.

As the titanium compound, a halogenated titanium compound is mentioned. The halogenated titanium compound means a compound containing a halogen atom and a titanium atom in which at least one halogen atom is bonded to the titanium atom. As specific examples thereof, compounds represented by the general formula $Ti(OR')_{4-n}X_n$ (wherein, R' is a hydrocarbyl group having 1 to 20 carbon atoms, X is a halogen atom, and $0 \leq n \leq 4$) are mentioned. In the general formula $Ti(OR')_{4-n}X_n$, X is preferably a chlorine atom.

Further, examples of the electron donating compound contained in the solid catalyst component include an oxygen-containing electron donor, a nitrogen-containing electron donor, and a sulfur-containing electron donor. Examples of the oxygen-containing electron donor include alcohols, phenols, ketones, aldehydes, carboxylic acids, esters of organic or inorganic acids, ethers, acid amides and acid anhydrides. Examples of the nitrogen-containing electron donors include ammonia, amines, nitriles, and isocyanates. Examples of sulfur-containing electron donor include sulfonic acid esters.

The solid catalyst component can be obtained by contacting the above-mentioned magnesium compound and titanium compound in a solvent. As the solvent for obtaining the solid catalyst component, for example, a saturated aliphatic hydrocarbon, a cyclic aliphatic hydrocarbon and an aromatic hydrocarbon are selected, and an aromatic hydrocarbon is more preferable, and it is, for example, one aromatic hydrocarbon selected from the group consisting of benzene, toluene and xylene. These solvents also may be contained as the liquid in the slurry transferred by the transfer method according to one aspect.

As the solid catalyst component, for example, those described in JP-A No. 63-142008, JP-A No. 4-227604, JP-A No. 5-339319, JP-A No. 6-179720, JP-B No. 7-116252, JP-A No. 8-134124, JP-A No. 9-31119, JP-A No. 11-228628, JP-A No. 11-80234 and JP-A No. 11-322833 may be used.

(Solid Catalyst Component: Metallocene-Based Catalyst)

As a metallocene compound used for preparation of a metallocene-based solid catalyst, transition metal compounds represented by the following general formula are mentioned.

$$L_xM$$

(Wherein, M represents a transition metal compound. x represents a number satisfying the valence of the transition metal M. L is a ligand coordinated to a transition metal, and at least one of L is a ligand having a cyclopentadienyl skeleton)

As the M, atoms of Groups 3 to 6 of the Periodic Table of the Elements (IUPAC 1989) are preferable, and titanium, zirconium and hafnium are more preferable.

Examples of the ligand having a cyclopentadienyl skeleton of L include a (substituted) cyclopentadienyl group, a (substituted) indenyl group and a (substituted) fluorenyl group, and specifically, a cyclopentadienyl group, a methylcyclopentadienyl group, a tert-butylcyclopentadienyl group, a dimethylcyclopentadienyl group, a tert-butyl-methylcyclopentadienyl group, a methyl-isopropylcyclopentadienyl group, a trimethylcyclopentadienyl group, a tetramethylcyclopentadienyl group, a pentamethylcyclopentadienyl group, an indenyl group, a 4,5,6,7-tetrahydroindenyl group, a 2-methylindenyl group, a 3-methylindenyl group, a 4-methylindenyl group, a 5-methylindenyl group, a 6-methylindenyl group, a 7-methylindenyl group, a 2-tert-butylindenyl group, a 3-tert-butylindenyl group, a 4-tert-butylindenyl group, a 5-tert-butylindenyl group, a 6-tert-butylindenyl group, a 7-tert-butylindenyl group, a 2,3-dimethylindenyl group, a 4,7-dimethylindenyl group, a 2,4,7-trimethylindenyl group, a 2-methyl-4-isopropylindenyl group, a 4,5-benzindenyl group, 2a-methyl-4,5-benzindenyl group, a 4-phenylindenyl group, a 2-methyl-5-phenylindenyl group, a 2-methyl-4-phenylindenyl group, a 2-methyl-4-naphthylindenyl group, a fluorenyl group, a 2,7-dimethylfluorenyl group, a 2,7-di-tert-butylfluorenyl group, and substituted compounds thereof. Moreover, when there exist multiple ligands which have a cyclopentadienyl skeleton, they may mutually be same or different.

Among L, ligands other than ligands having a cyclopentadienyl skeleton include groups having a hetero atom, halogen atoms, and hydrocarbon groups (provided that, groups having a cyclopentadiene type anion skeleton are excluded).

Examples of the hetero atom in the group containing a hetero atom include an oxygen atom, a sulfur atom, a nitrogen atom and a phosphorus atom, and examples of such a group include an alkoxy group; an aryloxy group; a thioalkoxy group; a thioaryloxy group; an alkylamino group; an arylamino group; an alkyl phosphino group; an aryl phosphino group; an aromatic or aliphatic heterocyclic group comprising at least one atom selected from the group consisting of an oxygen atom, a sulfur atom, a nitrogen atom and a phosphorus atom in the ring. Specific examples of the halogen atom include a fluorine atom, a chlorine atom, a bromine atom and an iodine atom. Moreover, as the hydrocarbon group, an alkyl group, an aralkyl group, an aryl group and an alkenyl group are mentioned.

Two or more L may be directly linked, or may be linked via a residue containing at least one atom selected from the group consisting of a carbon atom, a silicon atom, a nitrogen atom, an oxygen atom, a sulfur atom and a phosphorus atom. Examples of such residues include alkylene groups such as a methylene group, an ethylene group and a propylene group; substituted alkylene groups such as a dimethylmethylene (isopropylidene) group and a diphenylmethylene group; a silylene group; substituted silylene groups such as a dimethylsilylene group, a diethylsilylene group, a diphenylsilylene group, a tetramethyldisilylene group and a dimethoxysilylene group; and hetero atoms such as a nitrogen atom, an oxygen atom, a sulfur atom and a phosphorus atom, and particularly preferably, a methylene group, an ethylene group, a dimethylmethylene group (isopropylidene group), a diphenylmethylene group, a dimethylsilylene group, a diethylsilylene group, a diphenylsilylene group and a dimethoxysilylene group.

The metallocene compound includes, for example, bis(cyclopentadienyl)zirconium dichloride, bis(methylcyclopentadienyl)zirconium dichloride, bis(indenyl)zirconium dichloride, bis(4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride and dimethylsilyl(tetramethylcyclopentadienyl) (3,5-di-tert-buty 1-2-phenoxy) titanium dichloride. In addition, compounds in which dichloride is replaced with a group such as dimethoxide or diphenoxide can also be exemplified.

Further, the above-mentioned metallocene-based catalyst may be a catalyst in which the above-mentioned metallocene compound and an organoaluminum compound, an alumoxane compound, and/or an ionic compound are supported or impregnated on a particulate inorganic support or a particulate organic polymer support. Examples of the particulate inorganic support include silica and alumina. Examples of the particulate organic polymer support include polyethylene and polystyrene, and these are also examples of the inorganic compounds and the polymer compounds contained in the slurry.

(Step of Preparing Slurry of Prepolymerization Catalyst)

In the step of preparing a slurry of the prepolymerization catalyst, a small amount of an olefin monomer is preliminarily polymerized on the surface of a solid catalyst component in the presence of the solid catalyst component in a liquid, to obtain a slurry containing a liquid and the prepolymerization catalyst having a surface covered with a polymer of the olefin. The prepolymerization catalyst can be an aspect of the particle containing both an inorganic substance and an organic substance. As a method of preliminarily polymerizing the olefin monomer on the surface of the solid catalyst component, for example, bulk polymerization can be used. Bulk polymerization in a method in which, an olefin monomer is used as a polymerization solvent (liquid), the solid catalyst component prepared above is dispersed in this polymerization solvent and polymerization is performed in a state where the produced polymer is not dissolved in the polymerization solvent, and it is produced with a prepolymerization apparatus.

For bulk polymerization, known prepolymerization apparatuses can be used, and for example, stirring tank reactors and loop type reactors described in JP-B No. 41-12916, JP-B No. 46-11670 and JP-B No. 47-42379 can be used.

In the prepolymerization apparatus, bulk polymerization is carried out at a temperature and pressure at which the polymerization solvent is kept in a liquid state and the resulting polymer does not dissolve in the polymerization solvent. Specifically, the polymerization temperature is usually 30 to 100° C., preferably 50 to 80° C. The polymerization pressure is usually atmospheric pressure to 10 MPaG, preferably 0.5 to 5 MPaG. In bulk polymerization, at least one solvent selected from the group consisting of a saturated aliphatic hydrocarbon and a cyclic aliphatic hydrocarbon is preferably used in combination with a polymerization solvent as a dilution solvent. As the polymerization solvent and the dilution solvent, it is preferable to use one which has been sufficiently dehydrated and purified so as not to contain water and alcohol which may lower the catalyst activity.

The olefin monomer includes ethylene and propylene, and at least one olefin monomer selected from the group consisting of an α-olefin having 4 or more and 12 or less carbon atoms. Examples of the α-olefin having 4 or more and 12 or less carbon atoms include 1-butene, 1-pentene, 1-hexene, 1-octene, 1-decene, 1-dodecene, 1-tetradecene, 1-hexadecene, 1-octadecene, 1-ricosene, 4-methyl-1-pentene and 3-methyl-1-pentene, and these may be not only alone but also a mixture of two or more with other α-olefins.

For the olefin monomer, (i) propylene is used alone or (ii) propylene is used preferably together with ethylene or at least one olefin monomer selected from the group consisting of an α-olefin having 4 or more and 12 or less carbon atoms (hereinafter, referred to as an α-olefin other than propylene in some cases), and 1-butene is more preferably used as the olefin having 4 or more and 12 or less carbon atoms.

When using propylene in combination with an α-olefin monomer other than propylene in bulk polymerization, the content of the α-olefin monomer other than propylene in the polymerization solvent is preferably 0.01% by weight or more and less than 15% by weight.

The amount of the olefin monomer containing propylene is, for example, 1 to 50 g, preferably 1 to 40 g, more preferably 1 to 30 g, per 1 g of the solid catalyst component.

When a dilution solvent is used in bulk polymerization, examples of the dilution solvent include a saturated aliphatic hydrocarbon, a cyclic aliphatic hydrocarbon and an ether, and specific examples thereof include those exemplified as the liquid in the slurry.

Further, in bulk polymerization, it is preferable to use an organoaluminum compound and the above-mentioned electron donating compound in order to polymerize the polyolefin preliminarily.

The organoaluminum compound includes compounds represented by $R^1_{3-s}AlX_s$ or $R^2_{3-t}Al(OR^3)_t$ (wherein, $R^1$ and $R^2$ are each a hydrocarbyl group having 1 to 20 carbon atoms or a hydrogen atom, $R^3$ is a hydrocarbyl group, X is a halogen atom, and $0 \leq s < 3$ and $0 < t < 3$, respectively). As the organoaluminum compound, not only a single compound may be used, but also a plurality of compounds can be used in combination.

The polyolefin formed on the surface of the solid catalyst component by prepolymerization is preferably a propylene homopolymer, a propylene-ethylene random copolymer, a propylene-α-olefin random copolymer or a propylene-ethylene-α-olefin random copolymer.

The prepolymerization catalyst in which the polyolefin is formed on the surface is particulate, and is obtained as a slurry using a diluting solvent and an unreacted polymerization solvent as a dispersion medium. Here, the maximum particle diameter d of the particles of the prepolymerization catalyst contained in the obtained slurry may be advantageously measured. In addition, it is preferable to measure the particle concentration C of the prepolymerization catalyst contained in the slurry.

(Process of Transferring Slurry)

In the method for producing a polyolefin according to one aspect, the step of transferring the slurry transfers the slurry of the prepolymerization catalyst from the prepolymerizer or from a dilution tank for diluting the prepolymerization catalyst manufactured in the prepolymerizer to the polymerization reactor.

Based on the particle concentration C in the slurry of the prepolymerization catalyst, the ball diameter R of the check valve 10 and the maximum particle diameter d in the particles of the prepolymerization catalyst, the flow rate W of particle to be transferred to the polymerization reactor according to the slurry transfer method according to one aspect may be determined.

Also, before transferring to the polymerization reactor, the maximum particle diameter d of the particles of the prepolymerization catalyst contained in the slurry of the prepolymerization catalyst is measured, and based on the result, the particle concentration C in the slurry transferred to a dilution tank may be adjusted, for example, in a range of 0.001 kg/m³ or more and 500 kg/m³ or less, so as to obtain the desired particle flow rate W.

In the slurry transfer method used in the method of producing a polyolefin according to one aspect, the temperature of the slurry transferred by the plunger pump 100 is preferably in a range of −10° C. or higher and 90° C. or lowed.

The method of producing a polyolefin according to one aspect is a method that can determine the transfer amount of the prepolymerization catalyst subjected to the reaction in the polymerization reactor while specifying the condition under which clogging of the check valves 10 and 10' in the plunger pump 100 by the prepolymerization catalyst can be suitably prevented. Furthermore, when passing through the check valves 10 and 10' in the plunger pump 100, it is possible to suitably prevent the prepolymerization catalyst from forming aggregates. For this reason, it is possible to suitably prevent the inclusion of flake lumps in the polyolefin resin obtained by the polymerization reaction.

The production of a polyolefin is generally performed by a large-scale plant, and the suppression of clogging of the check valve by the prepolymerization catalyst contributes to stopping the operation of the plant and reducing the frequency of cleaning the valve. Therefore, the raw material loss occurring by cleaning and the environmental load due to the treatment of the waste liquid can be reduced.

Moreover, in the plant, the frequency of stopping operation and then restarting operation can be reduced, so that loss of raw materials and energy occurring at this time can be reduced. That is, plant operation can be streamlined and rationalized, and energy saving can be achieved.

(Step of Polymerizing Olefin)

The step of polymerizing an olefin is a step of polymerizing an olefin in the presence of the transferred slurry. Preferably, the olefin is polymerized by the polymerization reactor in the presence of a continuously transferred slurry of the prepolymerization catalyst.

The polyolefin produced by the production method according to one aspect includes (i) a propylene homopolymer, (ii) a propylene copolymer which is a copolymer of a propylene monomer and an olefin monomer other than propylene, and (iii) a heterophasic propylene polymer comprising a propylene homopolymer and a propylene copolymer.

Among them, the method of producing a polyolefin according to one aspect may be a method for suitably producing a heterophasic propylene polymer.

The content of the propylene copolymer in the heterophasic propylene polymer is 30% by weight or more, preferably 40% by weight or more, more preferably 50% by weight or more. It is preferable that the content of the propylene copolymer is 30% by weight or more from the viewpoint of improving the impact resistance of the molded product.

In the heterophasic propylene polymer, the content of an olefin monomer other than propylene (that is, at least one olefin monomer selected from the group consisting of ethylene and an α-olefin having 4 or more and 12 or less carbon atoms) in the propylene copolymer is preferably 15% by weight or more and 80% by weight or less.

Examples of the propylene copolymer include a propylene-ethylene copolymer, a propylene-1-butene copolymer, a propylene-1-hexene copolymer, a propylene-1-octene copolymer, a propylene-1-decene copolymer, a propylene-ethylene-1-butene copolymer, a propylene-ethylene-1-hexene copolymer, a propylene-ethylene-1-octene copolymer and a propylene-ethylene-1-decene copolymer. Preferred are a propylene-ethylene copolymer, a propylene-1-butene copolymer and a propylene-ethylene-1-butene copolymer.

In the production method according to one aspect, for example, the polymerization reaction of the heterophasic propylene polymer is performed using two or more, preferably three or more polymerization reactors. The polymerization reactor may be a slurry polymerization reactor or a gas phase polymerization reactor, and it is preferable that at least one polymerization reactor is a gas phase polymerization reactor. That is, using at least one polymerization reactor for producing a propylene homopolymer and at least one polymerization reactor for producing a propylene copolymer, these polymerization reactors are connected, and a propylene homopolymer and a propylene copolymer are polymerized continuously, to produce a heterophasic propylene polymer.

First, the slurry of the prepolymerization catalyst transferred by the transfer method according to one aspect, the above-mentioned organoaluminum compound, and the above-mentioned electron donating compound are introduced into the first polymerization reactor, and polymerization of the olefin monomer is conducted.

The polymerization temperature in each polymerization reactor is usually 0 to 120° C., preferably 20 to 100° C., more preferably 40 to 100° C. In each of the second and subsequent polymerization reactors, the polymer obtained in the polymerization reactor one upstream from the polymerization reactor is transferred, and the polymerization of the olefin monomer is performed in the presence of the polymer. In each of the second and subsequent polymerization reactors, the organoaluminum compound described above and/or the electron donating compound described above may be introduced.

The polymerization pressure in each polymerization reactor may be in the range in which an olefin can exist as a gas phase, and is atmospheric pressure to 10 MPaG, preferably 0.2 to 8 MPaG, and more preferably 0.5 to 5 MPaG. When the polymerization reactor is a gas phase polymerization reactor, the polymerization temperature and the polymerization pressure may be in the above ranges and the pressure may be such a pressure that an olefin can be present as a gas phase.

Further, in the final gas phase polymerization reactor in each of the polymerization reactors, an alkane having 6 or more carbon atoms is preferably introduced at a concentration of 0.01% by volume or more and 0.6% by volume or less, preferably 0.01% by volume or more and 0.3% by volume or less into a gas phase in the reactor, from the viewpoint of improving the powder properties. Examples of the alkane having 6 or more carbon atoms include hexane and heptane. The concentration of the alkane having 6 or more carbon atoms in the final gas phase polymerization reactor can be measured, for example, by installing process gas chromatography in a circulating gas line.

In the present specification, the final gas phase polymerization reactor refers to the gas phase polymerization reactor located at the most downstream side among the plurality of gas phase polymerization reactors. Moreover, if there is one gas phase polymerization reactor, the one gas phase polymerization reactor will be the final gas phase polymerization reactor.

For each gas phase polymerization reaction, known polymerization reactors, for example, reactors described in JP-A No. 58-201802, JP-A No. 590126406 and JP-A No. 2-233708 can be used.

According to the present invention, since it is possible to suppress the generation of flake lumps in the method of producing a polyolefin, for example, clogging of the gas circulation line of the gas phase polymerization reactor, clogging of transfer piping between a plurality of polymerization reactors and clogging of the drawn-out pipe for the formed polyolefin can be suppressed.

(Heterophasic Propylene Polymer)

The obtained heterophasic propylene polymer is in the form of fine particles, and the average particle diameter thereof is 1300 μm or more, preferably 1900 μm or more. Further, the upper limit value of the average particle diameter is preferably 5000 μm or less, more preferably 4000 μm or less. It is preferable that the range of the average particle diameter is in this range from the viewpoints of improvement of powder properties and load of the circulating gas compressor of the gas phase polymerization reactor.

The intrinsic viscosity of the propylene copolymer contained in the heterophasic propylene polymer is preferably 0.1 to 10 dL/g, more preferably 1 to 5 dL/g, further preferably 1.5 to 4 dL/g.

In addition, the static bulk density of the heterophasic propylene polymer is preferably 0.400 to 0.500 g/mL, more preferably 0.420 to 0.500 g/mL, further preferably 0.450 to 0.500 g/mL. In the present specification, the static bulk density means an index of powder properties.

<Applications of Heterophasic Propylene Polymer>

The heterophasic propylene polymer can be used suitably in molding methods such as, for example, an extrusion molding method, and injection molding method, a compression molding method, a foam molding method, a hollow molding method, a blow molding method, a vacuum molding method, a powder molding method, a calender molding method, an inflation method and a press molding method.

Examples of the application of the heterophasic propylene polymer include automobile parts such as automobile interior parts and exterior parts, food and medical containers, parts of furniture and electric products and civil engineering and construction materials. Examples of automobile interior parts include instrumental panels, trims, door panels, side protectors, console boxes, and column covers. Examples of automobile exterior part include bumpers, fenders or wheel covers. Examples of food and medical containers include wrap films, food containers, infusion bags, and infusion bottles. Examples of parts of furniture and electrical appliances include wallpaper, flooring, decorative sheets, and drainage hoses of washing machines. Examples of civil engineering and construction materials include waterproof sheets, water-impervious sheets, hoses, ducts and gaskets.

The present invention is not limited to the embodiments, and various modifications can be made within the scope of the claims, and embodiments obtained by appropriately combining the technical means respectively disclosed in different embodiments are also included in the technical scope of the present invention.

EXAMPLES

Examples of the invention are described below.

[Measurement of Maximum Particle Diameter of Particles Contained in Slurry]

The particle diameter of the particles contained in the slurry was measured by a laser diffraction method, and the particle diameter corresponding to 100% of the cumulative particle diameter distribution obtained was taken as the maximum particle diameter of the particles contained in the slurry. The maximum particle diameter was measured using a laser diffraction type particle size distribution measuring device (HELOS, manufactured by Sympatec).

The density of the liquid was measured at a temperature of 10° C. based on "6.8 the method of measuring density (actual measurement)" of JIS K 2240.

The density of the ball of the check valve was measured at a temperature of 10° C. by using Le Chatelier flask based on JIS Z 8807.

[Measurement of Amount of Flake Lumps Contained in Polymer Powder]

The amount of lumps having a particle diameter of 5 mm or more contained in the polymer powder obtained by polymerizing propylene was calculated as the amount of flake lumps.

The amount of lumps of 5 mm or more was calculated by the following formula using a stainless steel sieve (TESTING SIEVE, manufactured by TOKYO SCREEN Co., Ltd.) with an opening of 5 mm.

(Amount of lumps of 5 mm or more [weight ppm])=
(weight of polymer remaining on sieve after sieving)/(weight of polymer before sieving)×1,000,000

Example 1

(1) Preparation of Solid Catalyst Component

After purging a 100 mL flask equipped with a stirrer, a dropping funnel and a thermometer with nitrogen, 36.0 mL of toluene and 22.5 mL of titanium tetrachloride were charged into the flask and stirred. After setting the temperature in the flask to 0° C., 1.88 g of magnesium ethoxide was added 4 times every 30 minutes at the same temperature, and then stirred at 0° C. for 1.5 hours. Then, after 0.60 mL of ethyl 2-ethoxymethyl-3,3-dimethylbutanoate was charged into the flask, the temperature in the flask was raised to 10° C. Thereafter, the mixture was stirred at the same temperature for 2 hours, and 9.8 mL of toluene was added. Next, the temperature in the flask was raised at a rate of 1.2 K/min, and at 60° C., 3.15 mL of ethyl 2-ethoxymethyl-3,3-dimethylbutanoate was charged into the flask and the temperature was increased up to 110° C. The components charged into the flask were stirred at the same temperature for 3 hours. The resulting mixture was subjected to solid-liquid separation to obtain a solid. The solid was washed three times with 56.3 mL of toluene at 100° C.

To the solid after washing, 38.3 mL of toluene was added to form a slurry. 15.0 mL of titanium tetrachloride and 0.75 mL of ethyl 2-ethoxymethyl-3,3-dimethylbutanoate were added to the slurry to form a mixture, and the mixture was stirred at 110° C. for 1 hour. Thereafter, the stirred mixture is subjected to solid-liquid separation, the solid was washed three times with 56.3 mL of toluene at 60° C., and further washed three times with 56.3 mL of hexane at room temperature, and the washed solid was dried under reduced pressure, to obtain a solid catalyst component for olefin polymerization. The solid catalyst component (inorganic substance) had a titanium atom content of 2.53% by weight, an ethoxy group content of 0.44% by weight, and an internal electron donor content of 13.7% by weight. The solid catalyst component had an average particle diameter of 59.5 μm as determined by laser diffraction.

(2) Preparation of Prepolymerization Catalyst (Preparation of Slurry)

In a SUS autoclave equipped with a stirrer, triethylaluminum (TEA) was added to 1.3 L of fully dehydrated and degassed hexane so that the concentration was 20 mmol/L, and tert-butyl normal propyl dimethoxysilane as an electron donor component was added so that the molar ratio of tert-butyl normal propyl dimethoxysilane/TEA=0.1 (mol/ mol), and the above-mentioned solid catalyst component having an average particle diameter of 59.5 μm was added so that its concentration was 7.8 kg/m³, to obtain a slurry of the solid catalyst component. While maintaining the temperature of the slurry of the solid catalyst component at 15° C. or less, propylene was continuously fed until the feed amount per 1.0 g of the solid catalyst component reached 5.0 g, to obtain a slurry of the prepolymerization catalyst.

The obtained prepolymerization catalyst slurry was transferred to a SUS-made dilution tank equipped with a stirrer, sufficiently purified liquid butane was added to dilute, and the solution was stored at a temperature of 10° C. or less. In addition, in order to prevent the prepolymerization catalyst slurry from remaining in the prepolymerization tank and to sufficiently transfer it into the dilution tank, after transfer of the prepolymerization catalyst slurry, the inside of the prepolymerization tank was washed with 1.3 L of sufficiently dehydrated and degassed hexane, and the washing solution was transferred into the dilution tank. This washing operation was performed three times. Thereafter, the slurry concentration C of the prepolymerization catalyst in the dilution tank was adjusted to 0.034 kg/m³ by adding sufficiently purified liquid butane to dilute. Thereafter, the slurry of the prepolymerization catalyst was sampled, and the maximum particle diameter of the prepolymerization catalyst contained in the slurry was measured by a laser diffraction method. As a result, the maximum particle diameter d was 220 μm.

(3-1) Transfer of Slurry

Using the plunger pump 100 shown in FIG. 1, the slurry of the prepolymerization catalyst in the dilution tank was transferred to the slurry polymerization reactor, and the balls 1 (and balls 1') were made of SUS, and the diameter R thereof was 9.5 mm.

As described above, the slurry of the prepolymerization catalyst having a concentration of 0.034 kg/m³ was transferred to the first tank so that the particle flow rate W was $3.4 \times 10^{-4}$ kg/hr by using the plunger pump 100. As a result, the value calculated by $W(\rho_1/(\rho_b-\rho_1))^{0.5}/(C \cdot d(d+R)R^{0.5})$ was $1.4 \times 10^4$, satisfying all the conditions of (1) to (3) described above.

(3-2) Polymerization of Polypropylene

In the first tank, propylene homopolymerization was carried out using a vessel-type slurry polymerization reactor equipped with a stirrer. That is, the slurry of the prepolymerization catalyst was transferred to the first tank at a particle flow rate W shown in (3-1), and together, TEA having a concentration adjusted to 250 mmol/L using sufficiently dehydrated and degassed hexane was supplied at 33.8 mmol/hr, tert-butyl normal propyldimethoxysilane having a concentration adjusted to 5 mmol/L with sufficiently dehydrated and degassed hexane was supplied at 0.7 mmol/hr, propylene was supplied at 18 kg/hr and hydrogen was supplied at 36 NL/hr, and polymerized continuously under conditions of a polymerization temperature of 50° C. and a polymerization pressure of 2.6 MPaG, to produce polypropylene.

In the second tank, using a gas phase polymerization reactor, single-gas phase polymerization of propylene was performed at a polymerization temperature of 70° C. and a polymerization pressure of 2.0 MPaG in the presence of the polymer continuously transferred from the first tank. The continuous polymerization was carried out under the condition of continuously supplying propylene and hydrogen so that the gas concentration ratio (hydrogen/(hydrogen+propylene)) of the gas phase part was maintained at 7.7 vol %, to obtain 11.4 kg/hr of polypropylene stably.

The powder of polypropylene was recovered, and the flake lump amount (wt ppm) contained in the powder of polypropylene was measured.

Example 2

A powder of polypropylene was produced in the same manner as in Example 1 except that the slurry concentration C of the prepolymerization catalyst was adjusted to 0.150 kg/m³ in (2) Preparation of prepolymerization catalyst described above, the diameter R of the ball in the plunger pump was changed to 6.3 mm in (3-1) Transfer of slurry described above and the particle flow rate W of the slurry transferred to the first tank was changed to $7.0 \times 10^{-4}$ kg/hr in (3-2) Polymerization of polypropylene described above. The value calculated by $P = W(\rho_1/(\rho_b-\rho_1))^{0.5}/(C \cdot d(d+R)R^{0.5})$ was $1.2 \times 10^4$, satisfying the conditions of the formulae (1) to (3).

Example 3

A powder of polypropylene was produced in the same manner as in Example 1 except that the slurry concentration C of the prepolymerization catalyst was adjusted to 0.034 kg/m³ in (2) Preparation of prepolymerization catalyst described above, the diameter R of the ball in the plunger pump was changed to 6.3 mm in (3-1) Transfer of slurry described above and the particle flow rate W of the slurry transferred to the first tank was changed to $2.8 \times 10^{-3}$ kg/hr in (3-2) Polymerization of polypropylene described above. The value calculated by $P = W(\rho_1/(\rho_b-\rho_1))^{0.5}/(C \cdot d(d+R)R^{0.5})$ was $2.1 \times 10^5$, satisfying the conditions of the formulae (1) to (3).

Comparative Example

A powder of polypropylene was produced in the same manner as in Example 1 except that the slurry concentration C of the prepolymerization catalyst was adjusted to 0.060 kg/m³ in (2) Preparation of prepolymerization catalyst described above, the diameter R of the ball in the plunger pump was changed to 9.5 mm in (3-1) Transfer of slurry described above and the particle flow rate W of the slurry transferred to the first tank was changed to $3.4 \times 10^{-4}$ kg/hr in (3-2) Polymerization of polypropylene described above. The value calculated by $P = W(\rho_1/(\rho_b-\rho_1))^{0.5}/(C \cdot d(d+R)R^{0.5})$ was $7.8 \times 10^3$, not satisfying any of the conditions of the formulae (1) to (3).

The results of Examples 1 to 3 and Comparative Example are shown in Table 1 below.

TABLE 1

| | Example 1 | Example 2 | Example 3 | Comparative Example |
|---|---|---|---|---|
| maximum particle diameter d [μm] | 220 | 220 | 220 | 220 |
| ball diameter R [mm] | 9.5 | 6.3 | 6.3 | 9.5 |
| slurry particle flow rate W [kg/hr] | $3.4 \times 10^{-4}$ | $7.0 \times 10^{-4}$ | $2.8 \times 10^{-3}$ | $3.4 \times 10^{-4}$ |
| slurry concentration C [kg/m³] | 0.034 | 0.150 | 0.034 | 0.060 |
| liquid density (10° C.) $\rho_l$ [kg/m³] | 600 | 600 | 600 | 600 |
| ball density (10° C.) $\rho_b$ [kg/m³] | 7980 | 7980 | 7980 | 7980 |
| P [1] | $1.4 \times 10^4$ | $1.2 \times 10^4$ | $2.1 \times 10^5$ | $7.8 \times 10^3$ |
| clogging by slurry | none | none | none | clogging |
| flake lump generation amount [wt ppm] | 500 | 500 | 500 | 5000 |

[1] in the table 1: $P = W(\rho_l/(\rho_b - \rho_l))^{0.5}/(C \cdot d(d + R)R^{0.5})$ As shown in Table 1, in the powders of polypropylene produced by transferring the slurry of the prepolymerization catalyst to the polymerization reactor by the slurry transfer method of Example 1 and Example 2, the amount of flake lumps was 500 wt ppm or less in any case. Further, in the transfer method of Examples 1 and 2, malfunction and clogging in the plunger pump did not occur even if the slurry was continuously transferred to the plunger pump for 10 consecutive days. That is, it has been confirmed that the device can be stably operated for 10 consecutive days without stopping the polypropylene manufacturing apparatus (plant). Moreover, by suppressing the generation of flake lumps that cause the occurrence of equipment and piping clogging in the plant by this transfer method, it is possible to suppress the loss of raw materials when the clogging occurs and the generation of wastes.

On the other hand, in Comparative Example 1, the operation failure of the check valve occurred within one hour after the start of slurry transfer, and finally, the clogging of the pipe occurred with the slurry. The piping was disassembled and cleaned, and slurry transfer was repeated under the same conditions, but in any case, clogging by the slurry occurred in about 1 hour. For this reason, it became necessary to clean the valve each time the valve was clogged, and as a result, the production efficiency of the manufacturing apparatus (plant) was reduced.

As Examples 4 to 6, transfer of a slurry different from Examples 1 and 2 was evaluated.

Example 4

An example of the transfer of a slurry containing radiolite (filter aid) to a filtration device is shown. A slurry containing radiolite having a maximum particle diameter d of 50 μm and water as a dispersion medium was used. The slurry concentration C was 25 kg/m$^3$, the particle flow rate W of the slurry transferred to the filtration device was 0.5 kg/hr, the diameter R of the ball in the plunger pump was 6.3 mm, and the ball density $\rho_b$ was 7980 kg/m$^3$, and the slurry containing radiolite was transferred to the filtration device. Note that the value calculated by $W(\rho_1/(\rho_b-\rho_1))^{0.5}/(C \cdot d(d+R)R^{0.5})$ was $3.0 \times 10^5$, satisfying the condition of the formula (1).

Example 5

An example of the transfer of a slurry containing activated carbon to a wastewater treatment facility is shown. A slurry containing activated carbon having a maximum particle diameter d of 750 μm and water as a dispersion medium was used. The slurry concentration C of activated carbon was 40 kg/m$^3$, the particle flow rate W of the slurry transferred to the wastewater treatment facility was 25 kg/hr, the diameter R of the ball in the plunger pump was 20 mm, and the ball density $\rho_b$ was 7980 kg/m$^3$, and the slurry containing activated carbon was transferred to the wastewater treatment facility. Note that the value calculated by $W(\rho_1/(\rho_b-\rho_1))^{0.5}/(C \cdot d(d+R)R^{0.5})$ was $1.1 \times 10^5$, satisfying any of the conditions of the formulae (1) to (3).

Example 6

An example of the transfer of a slurry containing sludge (sludge) to a drainage tank is shown. A slurry containing sludge having a maximum particle diameter d of 2000 μm and water as a dispersion medium was used. The slurry concentration C of sludge was 30 kg/m$^3$, the particle flow rate W of the slurry transferred to the drainage tank was 30 kg/hr, the diameter R of the ball in the plunger pump was 22 mm, and the ball density $\rho_b$ was 3500 kg/m$^3$, and the slurry containing sludge (sludge) was transferred to the drainage tank. Note that the value calculated by $W(\rho_1/(\rho_b-\rho_1))^{0.5}/(C \cdot d(d+R)R^{0.5})$ was $8.9 \times 10^4$, satisfying any of the conditions of the formulae (1) to (3).

EXPLANATION OF NUMERALS

1, 1': ball
2, 2': guide
3, 3': pedestal
4: slurry particles
10, 10': check valve
11: casing
12, 12': tube
50: piston (plunger)
100: plunger pump

The invention claimed is:

1. A method of transferring a slurry comprises transferring a slurry containing particles and liquid using a transfer pump equipped with a ball type check valve, the transfer pump being operated under the condition satisfying the following formula (1) to transfer the slurry:

$$7.8 \times 10^3 < P \leq 5.0 \times 10^5 \quad (1)$$

wherein, $P = W(\rho_1/(\rho_b-\rho_1))^{0.5}/(C \cdot d(d+R)R^{0.5})$
in the formula (1), W represents the particle flow rate (kg/hr) in the slurry passing through the ball type check valve, C represents the particle concentration (kg/m$^3$) in the slurry, d represents the maximum particle diameter (m) of the particles in the slurry, R represents the ball diameter (m) of the check valve, $\rho_1$ represents the density (kg/m$^3$) of the liquid, and $\rho_b$ represents the density (kg/m$^3$) of the ball of the check valve.

2. The method of transferring a slurry according to claim 1, wherein the ball diameter of the ball type check valve is in a range of 5 mm or more and 50 mm or less.

3. The method of transferring a slurry according to claim 1, wherein the maximum particle diameter of particles in the slurry is 10 μm or more and less than 5000 μm.

4. The method of transferring a slurry according to claim 1, wherein the concentration of particles in the slurry is in a range of 0.001 kg/m$^3$ or more and 500 kg/m$^3$ or less.

5. The method of transferring a slurry according to claim 1, wherein the particle flow rate in the slurry passing through the ball type check valve is in a range of $1.0 \times 10^{-4}$ kg/hr or more and 100 kg/hr or less.

6. The method of transferring a slurry according to claim 1, wherein
the particles contained in the slurry are particles containing either or both of an inorganic substance and an organic substance,
the inorganic substance is at least one inorganic substance selected from the group consisting of an inorganic compound and a metal, and
the organic substance is a polymer compound.

7. The method of transferring a slurry according to claim 1, wherein the liquid of the slurry is a liquid containing at least one selected from the group consisting of a saturated aliphatic hydrocarbon, an unsaturated aliphatic hydrocarbon, a cyclic aliphatic hydrocarbon, an aromatic hydrocarbon, an alcohol, an ether, an ester, a ketone and water.

8. The method of transferring a slurry according to claim 7, wherein
the liquid of the slurry is a liquid containing at least one selected from the group consisting of a saturated aliphatic hydrocarbon, an unsaturated aliphatic hydrocarbon, a cyclic aliphatic hydrocarbon, an aromatic hydrocarbon and an ether, the saturated aliphatic hydrocarbon is at least one saturated aliphatic hydrocarbon selected from the group consisting of a saturated aliphatic hydrocarbon having 3 to 6 carbon atoms, the unsaturated aliphatic hydrocarbon is at least one unsaturated aliphatic hydrocarbon selected from the group consisting of an alkene having 3 to 6 carbon atoms, the cyclic aliphatic hydrocarbon is at least one cyclic aliphatic hydrocarbon selected from the group consisting of cyclohexane and methylcyclopentane, and the aromatic hydrocarbon is at least one aromatic hydrocarbon selected from the group consisting of toluene and xylene.

9. The method of transferring a slurry according to claim 1, wherein the temperature of the slurry transferred by using the transfer pump is in a range of −10° C. or higher and 90° C. or lower.

10. A method of producing a polyolefin comprising a step of transferring the slurry by the method of transferring a slurry according to claim 1, and a step of polymerizing an olefin in the presence of the transferred slurry, wherein the particles in the slurry are particles containing a catalyst.

* * * * *